J. F. T. SIMPSON.
TRACTOR.
APPLICATION FILED MAR. 1, 1918.
1,318,019.
Patented Oct. 7, 1919.
4 SHEETS—SHEET 2.
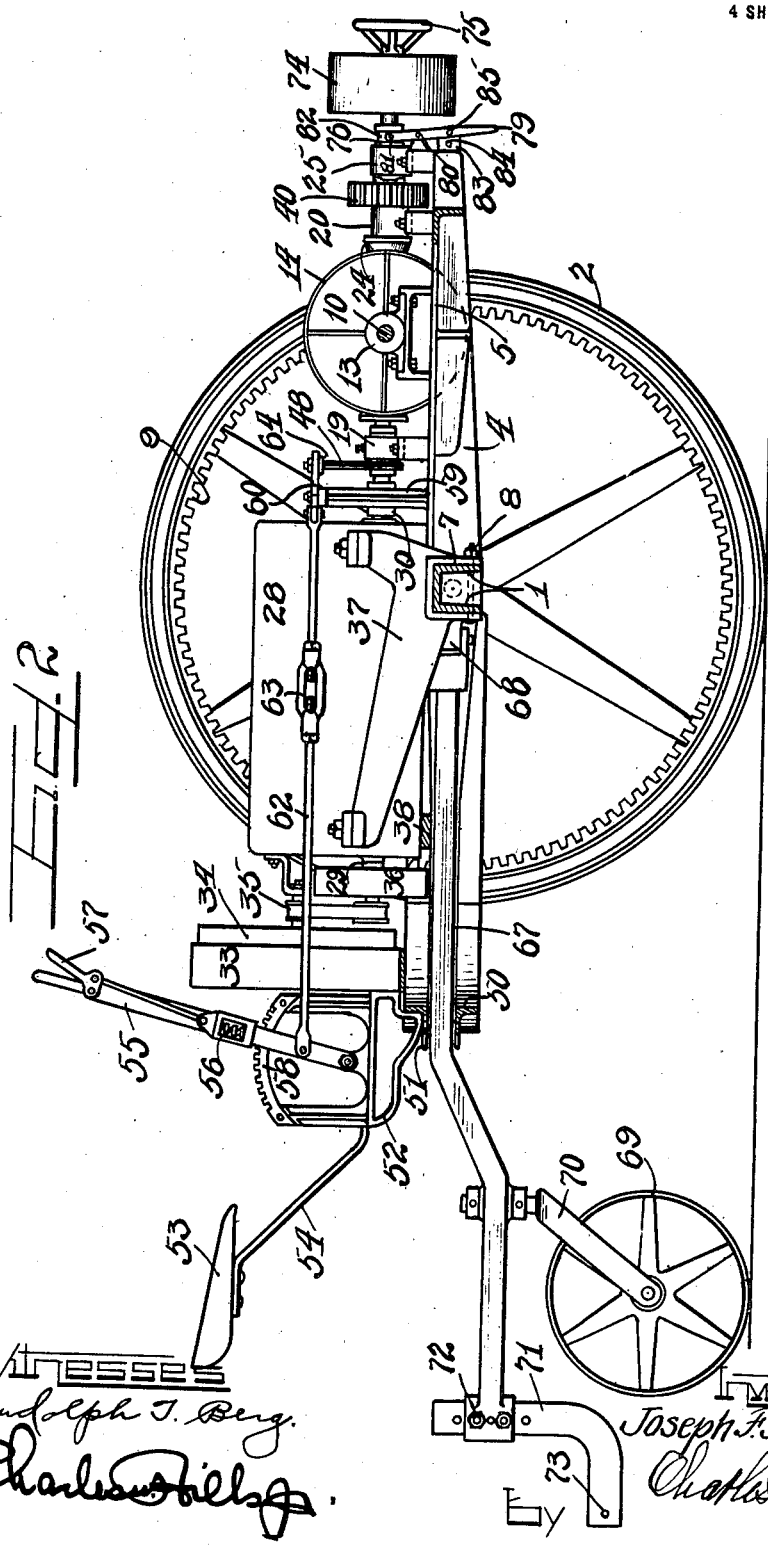

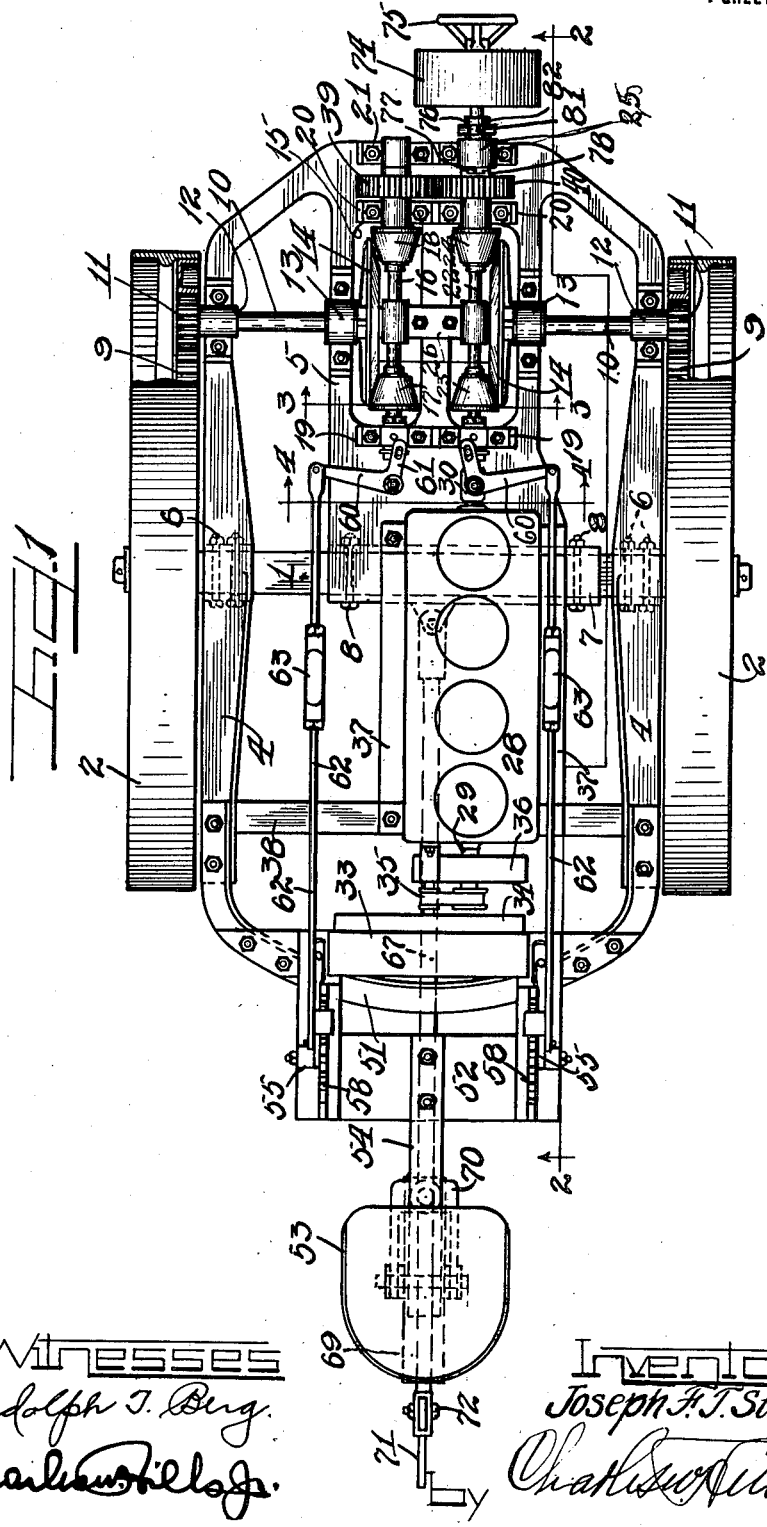

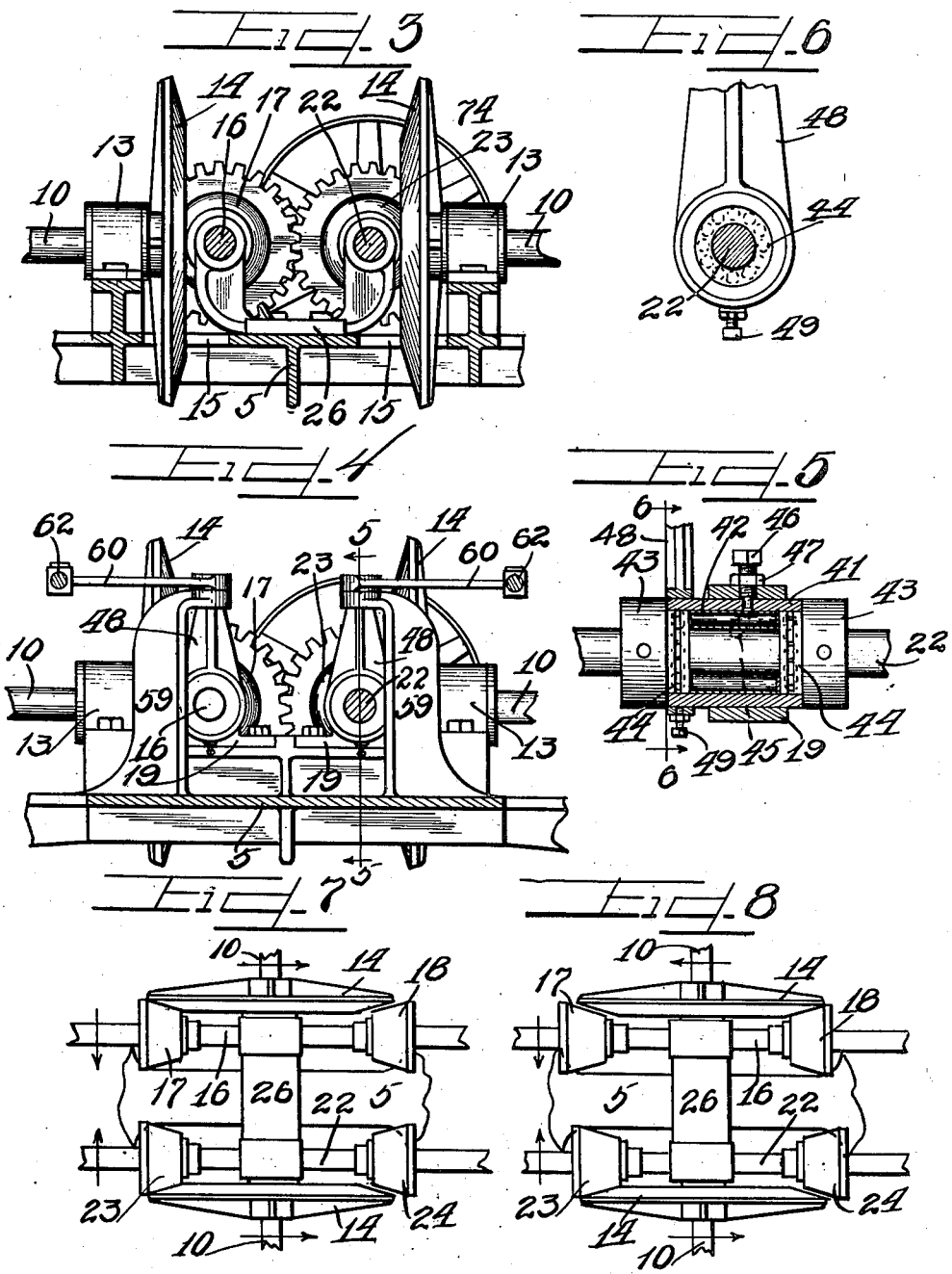

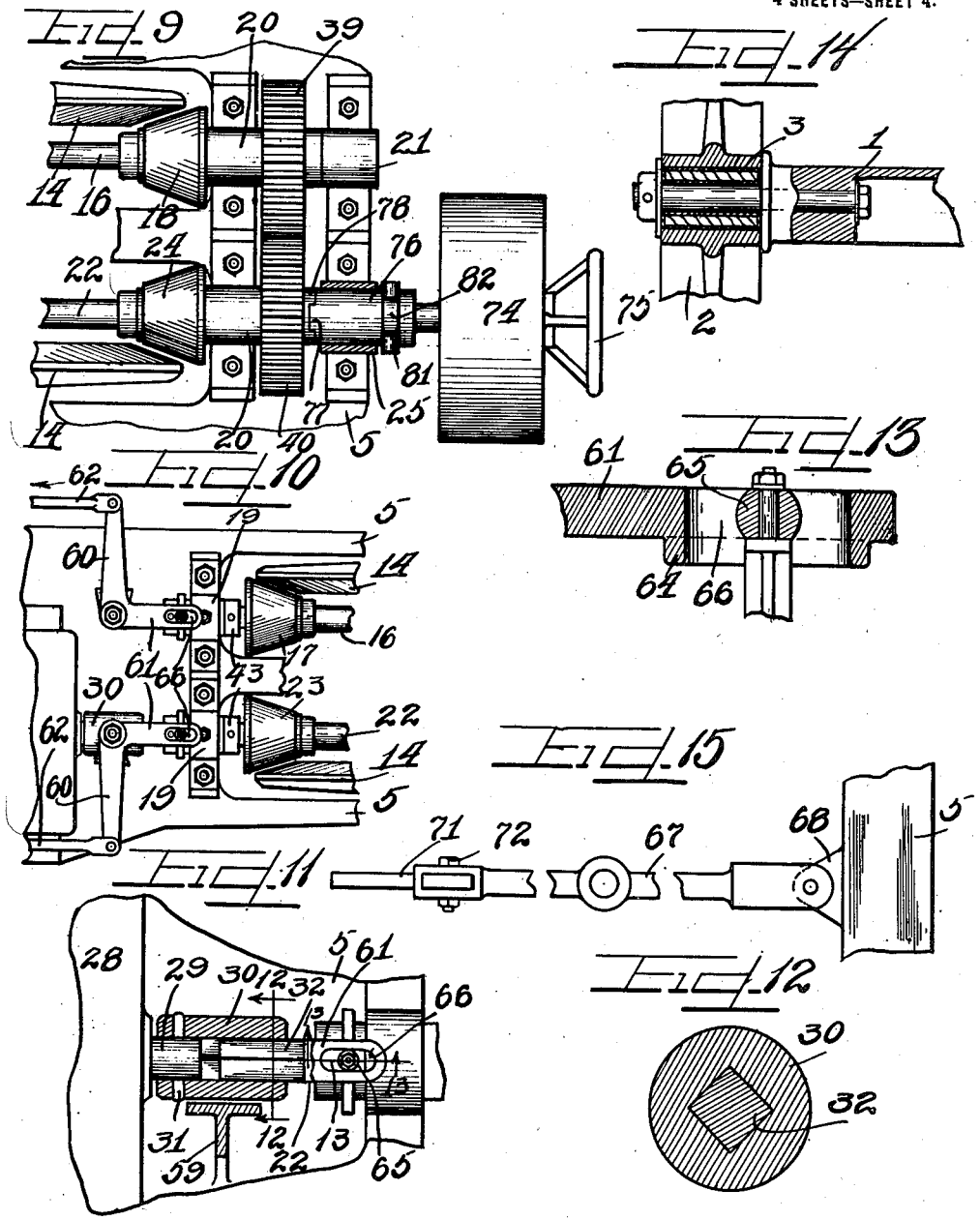

UNITED STATES PATENT OFFICE.

JOSEPH F. T. SIMPSON, OF CHICAGO, ILLINOIS.

TRACTOR.

1,318,019.      Specification of Letters Patent.      Patented Oct. 7, 1919.

Application filed March 1, 1918. Serial No. 219,790.

*To all whom it may concern:*

Be it known that I, JOSEPH F. T. SIMPSON, a citizen of the United States, and a resident of the city of Chicago, in the county of Cook and State of Illinois, have invented certain new and useful Improvements in Tractors; and I do hereby declare that the following is a full, clear, and exact description of the same, reference being had to the accompanying drawings, and to the numerals of reference marked thereon, which form a part of this specification.

This invention has reference more particularly to a tractor, having a ground or traction wheel at each side thereof which is connected with the motor so that each wheel may be driven simultaneously with, or independently of the other wheel in a forward or reverse direction.

The object of my invention is to provide an improved tractor of compact form with simple mechanism whereby the operation of the tractor can be effectively controlled.

Another object of my invention is to provide a simple transmission unit between the motor drive shaft and the traction wheels and connected therewith without intermediate gearing.

Another object of the invention is to provide a transmission mechanism connected directly with the drive shaft of the motor and with the traction wheels and wherein the transmission mechanism may be disconnected from the drive shaft so as to enable the motor to be used to operate other machinery without operating the transmission mechanism.

Another object of the invention is to provide a tractor with a pair of alining drive shafts similarly connected with the traction wheels and having a transmission mechanism intermediate of the inner ends thereof connected directly with the drive shaft of the motor whereby the alining drive shafts may be operated simultaneously or independently in either direction.

Another object of the invention is to provide a tractor with a pair of alining drive shafts connected directly with the traction wheels and having a transmission mechanism intermediate of the inner ends thereof connected directly with the drive shaft of the motor and comprising a pair of shiftable beveled drive members for each shaft whereby the shafts may be operated simultaneously or independently in either direction.

Another object of the invention is to provide a tractor with a pair of alining drive shafts connected directly with the traction wheels and having a transmission mechanism intermediate of the inner ends thereof connected directly with the drive shaft of the motor and comprising friction drive members and wedge acting means therefor for controlling the engagement of the friction drive members.

Another object of the invention is to provide a front wheel drive tractor with a pivoted rearwardly extending draft bar having a trailer wheel for supporting the rear end of the tractor.

My invention also has other important objects which will appear from the following specification, and the accompanying drawings.

The invention (in a preferred form) is described in the accompanying drawings and the following specification.

On the drawings:

Figure 1 is a plan view of a tractor constructed in accordance with my invention.

Fig. 2 is a side view, partly in section on the line 2—2 of Fig. 1.

Fig. 3 is an enlarged sectional view of the transmission mechanism on the line 3—3 of Fig. 1.

Fig. 4 is a similar view of the transmission mechanism on the line 4—4 of Fig. 1.

Fig. 5 is an enlarged sectional view on the line 5—5 of Fig. 4, showing details of the transmission control lever.

Fig. 6 is a sectional view on the line 6—6 of Fig. 5.

Fig. 7 is a diagrammatic view of the transmission mechanism in position to operate both tractor wheels in the same direction.

Fig. 8 is a similar view showing the mechanism shifted to operate the tractor wheels in opposite directions.

Fig. 9 is an enlarged top view of the forward end of the tractor.

Fig. 10 is a top view of the lever connections, whereby the transmission mechanism is controlled, Fig. 11 is a fragmentary top view showing the engine and transmission coupling in horizontal section.

Fig. 12 is an enlarged transverse sectional view on the line 12—12 of Fig. 11.

Fig. 13 is an enlarged sectional view of the operating lever connection taken on the line 13—13 of Fig. 11.

Fig. 14 is a fragmentary sectional view of an end of the tractor axle and spindle and the hub of the traction wheel thereon.

Fig. 15 is a fractured view of the tractor drawbar.

As shown on the drawings:

1, is the axle of the tractor which is rectangular in section and may be channeled as shown, and has a traction wheel 2, journaled at each end thereof preferably by means of roller bearings 3, so as to turn freely on the spindle. The main frame of the tractor comprises a pair of parallel side sills 4, which are connected at their forward ends and have the transmission base 5, therebetween and connected with the forward ends of the sills 4. The sills 4, and transmission base 5, may be made in an integral structure as shown, or built up in any suitable manner if desired, so as to form a substantial frame, and each sill 4, intermediate of its ends is formed on its under side with a rectangular yoke, which engages and is secured by means of the bolts 6, to the axle 1, close to the wheels 2. The rear end of the transmission base 5, is also provided with a similar transverse rectangular groove or yoke 7, which embraces the rectangular axle 1, and is secured thereto by means of bolts 8, in a similar manner to the sills 4, so that the tractor frame is firmly secured to the axle.

Each tractor wheel 2, is constructed with an internal gear 9, which may be made separately and bolted to the wheel if desired, whereby power is applied to the wheels, and at the forward end of the tractor frame is a pair of transverse shafts 10, each of which has a pinion 11, at the outer end in mesh with the internal gear 9, on one of the wheels 2, one of these shafts being thereby adapted to drive one of the tractor wheels and the other being adapted to drive the other wheel. These shafts 10, are mounted in alinement in the bearings 12 and 13, the former of which are at the forward end of the sill 4, and the latter of which are on the transmission base 5, and a large friction wheel 14, is secured on the inner end of each shaft and extends through an opening 15, provided therefor in the transmission base 5.

Extending lengthwise of the tractor frame across the face of one of the friction wheels 14, is a shaft 16, which has a pair of oppositely facing cone friction pinions 17 and 18, fastened thereon, said shaft being adapted to slide lengthwise in the bearings 19, 20 and 21, provided therefor on the transmission base 5, so as to be operable to move either the cone friction pinion 17 or 18, into driving engagement with the friction wheel 14. A shaft 22, is similarly mounted across the face of the other friction wheel 14, in bearings 19, 20 and 25 on the base 5, and has the cone friction pinions 23 and 24, fixed thereon, which likewise may be brought into driving engagement with said wheel 14. A bracket 26, is bolted on the transmission base 5, intermediate of the wheels 14, and has a bearing for each of the shafts 16 and 22, intermediate of their cone friction pinions, to securely hold the shaft so that the pinions will properly engage with the wheels 14.

The shaft 22, projects through the end bearing 19, and has the end thereof connected with the crank shaft of the motor 28, from which power is obtained for operating the tractor wheels 2, and to permit sliding movement of the shaft 22, independently of the motor 28, I have provided the motor crank shaft 29, with a sleeve 30, which is secured thereon by means of a pin 31, and is internally squared at the outer end to engage the squared end 32, of the shaft 22. This construction insures turning of the shaft 22, with the crank shaft 29, and at the same time permits longitudinal movement of the shaft 22, independently of the crank shaft 29, of the motor.

The motor 28, may be of any desired construction, and in the present instance it is indicated as of the four cylinder type with a radiator 33, suitably mounted on the frame of the tractor in proximity thereto and there is a fan 34, journaled in front of the radiator, and driven by means of a belt 35, from the crank shaft 29, of the motor, this connection being shown on the crank shaft at the other side of the fly-wheel 36, from the motor.

For supporting the motor, the transmission base 5, at the rear end, has a pair of spaced brackets 37, extending lengthwise of and embracing the motor and connected with each end thereof, and the end of the motor farthest distant from the axle 1, may be additionally supported by means of the cross-brace 38, which connects the rear ends of the sills 4.

To operate the shafts 16 and 22, simultaneously from the motor 28, said shafts are provided at their forward ends with the intermeshing spur gears 39 and 40, respectively, which are slidably mounted on the shafts and connected to turn therewith, the former being keyed on its shaft 16 in the well-known manner and the latter being connected with the shaft 22, as hereinafter explained, so that the shafts 16 and 22, may be reciprocated without disturbing the driving connection between the gears 39 and 40, For reciprocating the shafts 16 and 22, to control the engagement of their cone friction pinions with the wheels 14, and in order to impart a powerful pressure to effect a tight frictional contact thereof, each of the bearings 19, has a sleeve 41, mounted to slide and turn therein and has the shaft 16 or 22, journaled to turn freely in the sleeve by means of the roller bearings 42, and secured therein against endwise movement by the collars 43, which are pinned on the shaft, and engage the end thrust bearings 44, at each end of the sleeve 41. A spiral slot indicated by dotted lines at 45, in Fig. 5, is provided in the sleeve 41, and engaged by the inner end of a cap screw 46, which is threaded through the bearing 19, and locked in position by means of the lock nut 47, so that as the sleeve is rotated it is also moved endwise, and there is a lever 48, connected at one end of the sleeve 41, at a suitable distance from the bearing 19, to permit the required longitudinal movement of the sleeve 41, in the bearing, which lever is secured to the sleeve 41, by means of the set screw 49, or in any other suitable manner so that the sleeve 41 may be turned thereby. With this construction, when the lever 48, is moved arcuately around the shaft, the sleeve 41, is caused to turn therewith, and by reason of the engagement of the inner end of the set screw 46, with the spiral slot 45, the sleeve 41, is caused to slide lengthwise in the bearing 19, and thereby moves the shaft 16, or 22, longitudinally to control the engagement of the friction pinions with the friction wheels 14.

The rear ends of the sills 4, of the tractor frame are connected by means of a pair of arcuate angle irons 50, and 51, which are spaced in parallel relation to provide a slotted guide, for purposes hereafter described, and a foot board 52, is secured at the rear of the tractor frame, on the upper channel iron 51, and has the seat 53, mounted thereon by means of the bracket 54, so that the foot board 52, provides a foot rest or footing for the operator in the seat 53. A lever 55, is pivoted at each side of the foot board 52, so that the upper end is within convenient reach of the operator in the seat 53, and each has a pawl 56, controlled by the grip lever 57, and adapted to engage the notches of the rack segment 58, to hold the lever in any position of adjustment.

These levers are designed to operate the shafts 16 and 22, of the transmission mechanism to control the operation of the traction wheels 2, and are connected therewith in the following manner:

Near the rear end of each shaft 16 and 22, is a bracket 59, which may be integral with the transmission base 5, or attached thereto and extends upwardly therefrom and has a bell crank lever 60, vertically pivoted at the upper end thereof so that one arm 61, of the lever projects forwardly to engage the upper end of the lever 48, whereby the shaft 16 or 22, is reciprocated. There are two of these levers 60, one for controlling the shaft 16, and the other for controlling the shaft 22, the former of which controls the operation of the left hand tractor wheel and is connected with the lever 55, at the operator's left hand and the latter of which is connected with the other lever 55, at the operator's right hand, and the arrangement of the slots 45, in the sleeves 41, is such that forward movement of either lever 55, operates the transmission to impart a forward movement to its respective traction wheel and reverse movement of the lever imparts a reverse movement thereto, so that the operation of the tractor wheel corresponds with the movement of the operating lever. Each lever 60, is connected with its operating lever 55, by means of a rod 62, which has a turnbuckle 63, interposed therein, or is otherwise provided with means whereby the length of the rod may be adjusted to effect the desired relative operation of the operating lever 55, and the mechanism which it controls.

The lever 48, whereby the sleeve 41, is operated moves arcuately on a horizontal axis and the lever 60, moves similarly on a vertical axis and there is consequently a separation which must be provided for in the connection between the outer end of the arm 61, and the upper end of the lever 48. To this end the outer end of the arm 61, is slotted longitudinally and has the flange or skirt 64, extending around the lower edge of the slot so as to provide sufficient width, to insure engagement when the upper end of the lever 48, moves downwardly owing to its arcuate movement, and said lever has a ball 65, secured to the upper end thereof and engaging in the slot 66, to permit the necessary relative movement of the arm 61, and lever 48.

This tractor is adapted particularly for farm work, although not limited to such use, and is designed for pulling plows, or any other implements. For this purpose, a drawbar 67, is provided which is pivoted at its forward end to a lug 68, at the rear end of the transmission base 5, near the axle 1, and midway between the ends thereof, and this drawbar extends rearwardly between the arcuate angle iron guides 50 and 51, so that it can swing only in a horizontal plane. Beyond the angle iron guides 50 and 51, the drawbar may be bent downwardly as shown, and is provided with a trailer wheel 69, which is mounted in a caster bracket 70, which is vertically pivoted on drawbar 67, so as to freely follow the movement of the tractor. The main support of the tractor is provided by the axle 1, and traction wheels 2, and the machinery of the tractor is suitably mounted so that the greater part of the weight thereof is carried by the tractor wheels 2, so as to insure substantial engagement of the tractor wheels with the ground, a portion of the weight however being sustained by the trailer wheel 69, so as to maintain the tractor frame in the normal horizontal position and prevent the same from tilting forwardly. A hitch bar 71, is connected at the rear end of the drawbar 67, and adjustable vertically in an opening thereof by means of the bolts 72, and has the lower end thereof bent rearwardly and provided with an eye 73, for hitching and pulling purposes. The connecting lever 71, may thus be adjusted to provide the desired line of draft to the plow or other implement pulled by the tractor.

It may be desired to use the power of the motor for operating other stationary machinery and to enable it to be so used I have extended the shaft 22, which is connected directly with the motor 28, beyond the forward end of the tractor frame, and mounted a friction clutch pulley 74, thereon, which may be connected to turn with the shaft 22, by means of a clutch operating wheel 75. I have not shown a specific construction of clutch mechanism for this purpose as such devices are thoroughly well known and any suitable clutch device may be employed for this purpose. In order that the transmission mechanism may be disconnected when the motor is used for operating other machinery, the gear 40, is mounted loosely upon the shaft 22, and the bearing 25, has a sliding clutch sleeve 76, thereon, with clutch lugs 77, the inner end of which may be caused to engage with corresponding clutch lugs 78, on the outer face of the gear 40, and this clutch member 76, is keyed on the shaft 22, to turn therewith and slide thereon so that it may be moved inwardly to engage the clutch lugs 78, on the gear 40, and allow the gear to turn with the shaft 22, or may be moved outwardly so that the shaft 22, may be turned without operating the gear 40. For operating the clutch member 76, a lever 79, is pivoted at the forward end of the tractor frame, as at 80, and has a yoke 81, at the upper end which engages in an annular groove 82, in the outer end of the clutch sleeve 76, so that the clutch sleeve is free to turn and may be moved longitudinally by moving the lever 79. A projection 83, projects forwardly from the front end of the tractor frame adjacent to the lever 79, and is provided with perforations 84, with which the perforation 85, registers when the clutch has been moved to either of its positions and a pin may be passed through these openings, to hold the lever and clutch in either position to which it is adjusted.

The operation is as follows:

When the machine is to be used for a tractor the lower end of the lever 79, is pulled forwardly so that the clutch 76, engages the gear 40, and locks the gear for movement with the shaft 22, and the pin is passed through the perforations 84, and 85, in the projection 83, and lever 79, respectively to hold the clutch 76, in engagement with the gear 40. The hand levers 55, are both set midway of the segments 58, in which position the friction cone pinions 17, 18, 23 and 24, will be separated from engagement with the friction wheels 14, and the motor 28, can then be operated without operating the traction wheels 2. The motor 28, is then set in operation and if the tractor is to be moved forwardly in a straight line both levers 55, are pushed forward simultaneously so that both levers 60, are operated and the shaft 16, and the shaft 22, are both slid forwardly in their bearings so that the pinion 17 on the shaft 16, engages with the friction wheel 14, that drives the left hand tractor wheel 2, and the pinion 23, on the shaft 22, engages the friction wheel 14, that drives the right hand tractor wheel 2. Both wheels 2, will then operate similarly and the tractor will move forward in a straight line.

Reverse movement is similarly effected by simultaneously pulling both levers 55, backwardly whereupon the pinions 18 and 24, will be moved rearwardly to engage their respective gear wheels 14, and impart simultaneous movement to the traction wheels 2, to cause the tractor to move rearwardly in a straight line.

With the transmission mechanism which I have provided it is possible to operate the traction wheels 2, simultaneously or independently in either direction and it is through the medium of this transmission that the operator is enabled to steer the tractor. If the tractor is being driven forwardly and it is desired to turn the tractor to one side or the other the lever on the side to which the tractor is to be turned is drawn rearwardly so that the pinion 17 or 23, as the case may be, will slip or be entirely disengaged from its respective friction wheel 14, whereupon the traction wheel 2, at that side of the machine will be retarded or stopped and the operation of the other tractor wheel will cause the tractor to turn, and when the tractor has been turned to the desired extent the lever which has been disengaged is thrown forwardly again so that pinion 17 or 23 again engages the gear wheel 14, and the tractor will then proceed in a straight line. The same method of control may be exercised if the tractor is being moved rearwardly.

If it is desired to make a short turn with the tractor, which is often necessary in plowing or cultivating a field, the tractor may be turned within its own length by throwing one lever 55, forward and the other lever 55, rearwardly, whereupon the wheels 2, will be reversely operated and a short turn will be made. The trailer wheel 69, on account of its pivotal connection with the drawbar 67, and because of the pivotal connection of the drawbar with the traction frame will readily follow the tractor frame in any turn that it makes and the drawbar thus enables the implement attached thereto to follow the tractor as it makes a turn much more readily than if the drawbar were rigidly connected with the tractor frame.

The friction drive which I have provided enables the operator to more readily and effectively control the operation of the tractor than would be possible if spur gears were employed, as engagement is easily effected and may be adjusted to permit slipping, and the spirally movable operating member for controlling the engagement of the pinions not only enables an accurate control to be maintained over the operation of the tractor, but also causes the pinions to engage the friction wheels 14, with sufficient tension to insure a positive drive.

When the motor is to be used for operating other stationary machinery the lever 79, is moved to withdraw the clutch 76, from engagement with the gear wheel 40, and the levers 55, are of course moved to the neutral position, whereupon the shaft 22, may operate without turning the gear 40, and without operating the shaft 16, thus providing a direct and independent drive for the pulley 74, at the outer end of the shaft 22. The clutch wheel 75, may then be operated to clutch the wheel 74, to the shaft 22, and a belt may be applied to this wheel for connection with any desired machinery.

While I have shown my invention in a certain specific form, I am aware various changes and modifications may be made without departing from the spirit of my invention, and I therefore do not purpose limiting the patent granted hereon otherwise than necessitated by the prior art.

I claim as my invention:

1. In a tractor, the combination with the frame and a traction wheel at each side thereof, of a transmission mechanism comprising a pair of beveled friction wheels connected with the traction wheels, a pair of reciprocal parallel shafts each having a pair of cone friction pinions thereon adapted to engage one of the beveled friction wheels, means for selectively engaging the cone friction pinions with the friction wheels, so as to operate the traction wheels simultaneously or independently in either direction, and a motor mounted on the frame adjacent to and connected directly with said transmission.

2. In a tractor, the combination with the frame, and a traction wheel at each side thereof, of a transmission mechanism comprising a pair of alined shafts connected with the traction wheels, a beveled friction wheel on each shaft, a pair of reciprocal parallel shafts each having a pair of cone friction pinions thereon adapted to engage one of the beveled friction wheels, means for selectively engaging the cone friction pinions with the friction wheels, so as to operate the traction wheels simultaneously or independently in either direction, and a motor mounted on the frame with its shaft in alinement with and connected directly with one of said reciprocal shafts.

3. In a tractor, the combination of a frame with a traction wheel at each side thereof, a transmission mechanism connected with said traction wheels and comprising a pair of oppositely arranged beveled friction wheels, a pair of parallel shafts intermediate of said friction wheels having cone friction pinions thereon adapted to engage with the friction wheels, a spur gear on each shaft meshing with the spur gear on the other shaft for simultaneously operating the shafts, and a motor having the drive shaft thereof in alinement with and connected with one of said shafts.

4. In a tractor, the combination of a frame, a tractor wheel at each side thereof, a transversely extending shaft connected with each tractor wheel, a transmission mechanism intermediate of said shafts comprising a beveled friction wheel on each shaft, a pair of parallel shafts intermediate of said wheels and having cone friction pinions thereon adapted to be engaged with said friction wheels, a spur gear on each shaft meshing with the spur gear on the other shaft, means for disengaging one of the spur gears from its shaft, and a motor connected with said shaft.

5. In a tractor, the combination of the frame, a traction wheel at each side of the frame, having a concentric gear for operating the traction wheel, a pair of alining transverse shafts each having a pinion at the outer end thereof meshing with the concentric gear of one of the traction wheels, a friction wheel at the inner end of each transverse shaft, a pair of parallel shafts intermediate of the friction wheels each having a pair of friction pinions thereon adapted to engage one of the friction wheels, a motor having its power shaft extending in the same direction as and connected directly with one of the parallel shafts, means for simultaneously operating the other parallel shaft, and means for selectively engaging the friction pinions with the friction wheels so as to operate the traction wheels simultaneously or independently in either direction.

6. In a tractor, the combination of the frame, a traction wheel at each side of the the frame, having a concentric gear for operating the traction wheel, a pair of transverse shafts each having a pinion at the outer end thereof meshing with the concentric gear of one of the traction wheels, a friction wheel at the inner end of each transverse shaft, a pair of parallel shafts intermediate of the friction wheels each having a pair of friction pinions thereon adapted to engage one of the friction wheels, a gear on each parallel shaft meshing with the gear on the other shaft for simultaneously operating said shafts, a motor having the power shaft in alinement and coupled with one of said parallel shafts, and means for shifting the friction pinions to engage the friction wheels so as to operate the traction wheels simultaneously or independently in either direction.

7. In a tractor the combination of the frame, a traction wheel at each side of the frame, a pair of friction wheels for operating the traction wheels, a pair of parallel shafts intermediate of the friction wheels each having a pair of friction pinions thereon adapted to engage the friction wheels, clutch controlled means for operating said parallel shafts simultaneously or independently, a motor power shaft connected with one of said parallel shafts, and a clutch controlled pulley on the last mentioned parallel shaft.

8. In a tractor the combination of the frame, a traction wheel at each side of the frame, a pair of friction wheels for operating the traction wheels, a pair of parallel shafts intermediate of the friction wheels, each having a pair of friction pinions adapted to engage one of the friction wheels, a motor connected to operate the pinions, means for adjusting the friction pinions to engage the friction wheels so as to direct the movement of the tractor and a draw bar extending rearwardly from the frame and having a trailer wheel pivoted thereon so as to support the rear end of the tractor and automatically change its direction to accord with the direction of movement of the tractor.

9. In a tractor the combination of the frame, a traction wheel at each side of the frame, a pair of friction wheels for operating the traction wheels, a pair of parallel shafts intermediate of the friction wheels, each having a pair of friction pinions adapted to engage one of the friction wheels, a motor connected to operate the pinions, means for adjusting the friction pinions to engage the friction wheels so as to direct movement of the tractor, and a drawbar vertically pivoted to and extending rearwardly of the frame, so as to swing from side to side thereof, and having a caster wheel connected therewith so as to support the rear end of the frame.

10. In a tractor the combination of the frame, a traction wheel at each side of the frame, a pair of friction wheels for operating the traction wheels, a pair of parallel shafts intermediate of the friction wheels, each having a pair of friction pinions adapted to engage one of the friction wheels, a motor connected to operate the pinions, means for adjusting the friction pinions to engage the friction wheels so as to direct the movement of the tractor, and means for supporting the rear end of the tractor frame comprising a drawbar pivoted adjacent to the axle of the tractor wheels and extending rearwardly from the frame, a pair of guide members at the rear of the frame for confining the drawbar for horizontal transverse movement, and a caster wheel vertically pivoted to the drawbar.

In testimony whereof I have hereunto subscribed my name in the presence of a subscribing witness.

JOSEPH F. T. SIMPSON.

Witness:
FRED E. PAESLER.